UNITED STATES PATENT OFFICE.

JAMES A. HAWLEY, OF BEAVER DAM, WISCONSIN.

IMPROVED COMPOSITION FOR ROOFING HOUSES.

Specification forming part of Letters Patent No. 28,577, dated June 5, 1860.

*To all whom it may concern:*

Be it known that I, J. A. HAWLEY, formerly of the town of Jackson, county of Jackson, and State of Michigan, but now of Beaver Dam, Wisconsin, have invented a new and Improved Chemical or Composition Roof; and I hereby declare that the following is a full and clear description thereof.

The nature of the invention consists in forming the roof of layers of lime-mortar—that is, lime and sand and oil. The oil is either mixed in or afterward added and absorbed into the mass, and two or more layers or strata of sand, lime, and oil are put on to form a roof.

In making the mixture of lime, sand, and oil it is not necessary that the oil be fresh and sweet. Rancid oil is equally good, and any drying oil will answer the purpose, whether fresh or rancid. I prefer also to mix the mortar and oil several days before it is to be used when this mode of working is used, and repeatedly work it over, exposing fresh surface to the atmosphere daily for several days before it is spread on the roof. By this means the lime-soap hardens partially by the gradual oxidation and saponification of the oil by means of the lime and the oxygen of the air.

The exact proportion of sand, oil, and lime is not so indispensable as might as first sight appear, but admits of considerable variation in the proportions, as will be seen from the fact that if the lime should slightly predominate over the oil necessary to neutralize it the excess will be neutralized by the carbonic acid of the atmosphere; and if the oil be in excess over the lime, that excess, being in contact with the lime-soap already formed, is rapidly oxidized and stiffened thereby. I usually mix the sand and lime in proportion of eight sand and one lime.

As I have before stated, the materials may be mixed and stirred several days in succession before the same are put on the roof; or they may be put on separate, as follows—that is: Mix eight measures of sand and one measure of lime into mortar with water, and then add in sand so long as the toughness of the mortar is not sensibly impaired. It is then prepared to be spread on the roof, which is previously boarded over with narrow boards—say three inches wide—well nailed, and the mortar is spread over the surface and well troweled down with frequent wetting.

I frequently add a little potash or soda or other alkaline matter to the mortar—say about two per cent. of the mortar—when I desire to hasten the operation of hardening the composition. An increased proportion of lime may be added; but a little ashes of wood, well burned, or common salt, not to exceed three or five per cent., will answer as well.

When the mortar is sufficiently hard and dry it is covered over with the oil, as much as will dry in. The oil should be put on as soon as the water has dried out of the mortar, so that the lime may immediately act on the oil to harden it. This is a quicker and cheaper mode of saturating the lime and oil than when the ingredients are mixed in the mortar, and for most purposes equally good. The other method, although more expensive, is more permanent and stronger to resist severe tests. It is therefore better adapted to roofs used to walk on and other like exposures.

Now, although the single layer prepared in either of these ways has been found to withstand the action of both rain and frost in succession during two most trying winters, yet, to secure a greater permanency and give additional protection, I repeat the coat by another outside coat, put on in the same manner as the original coat, but may be thinner. This protects the former from direct action against it by the weather, and thus in a measure keeps it more flexible and impenetrable to water for a long time. Should the outer coat at any time crack, it may be repaired without affecting the integrity of the inner coat.

The first coat or layer may be floated down the roof in the manner well understood by those accustomed to work in cements for roofing purposes. This mode of covering is preferable to troweling down the surface, as a second coat adheres more firmly. I make this coat about three-fourths of an inch in thickness.

I am aware that a kind of stucco has been formed of oil and sand and litharge for covering the walls of houses on the outside, such as the Hamelin patent cement mastic; but this composition is very different from mine, and the hardening is produced in a different way and by different chemical action, that being confined to the simple action of litharge used as a drier, while mine depends upon the saponifying action of the lime and the subsequent hardening of the lime-soap so formed.

I am also aware that compositions of a mixed character to form a cement stone have been used in which oil, litharge, sand, and lime were ingredients; but, from the large proportion of lime to the oil, (being forty to one,) the composition is incoherent and utterly worthless as a cement. This composition referred to is that of Thomas Hodgson, rejected 11th September, 1854. Now, it is a fact well known to chemists that the integrity of a good composition even may be just as readily undermined and its value destroyed by one ingredient too many as by one too few, by having a proportion too large as well as by having a proportion too small.

I am also aware that tiles have been laid on roofs in lime-mortar mixed with oil to form a roofing-surface. Such roofs are very heavy and very expensive, on neither of which accounts could they be used as a cheap roof or a roof adapted to a wooden building, where cheapness and lightness are indispensable. Besides this, I do not claim making a tile roof, nor the mixing of oil in green mortar, as that and this have been described as having been done by the Roman engineers and architects, as described by Vicat on cements. I do not therefore claim the mixing of lime, sand, water, and oil together, irrespective of the particular use that is made of such mixture; but

I claim—

Making roofs of this composition without the use of tiles or slates or canvas, or any other roofing material or agents, in connection therewith, substantially as herein set forth.

JAMES A. HAWLEY.

Witnesses:
E. TOWNSEND MIT,
C. C. QUIN.